Sept. 1, 1925.

C. F. KETTERING ET AL 1,552,170

WEIGHING MACHINE

Filed May 11, 1923

Witnesses
Geo. E. Pasco
Wm. P. Pasco

Inventors
Charles F. Kettering
and
Charles L. Lee
By Francis D. Hardesty
Their Attorney

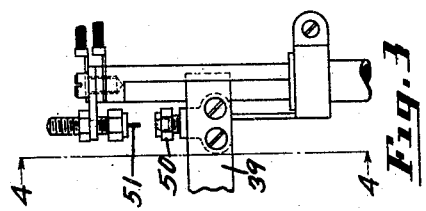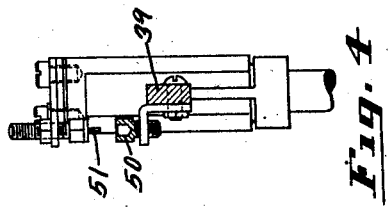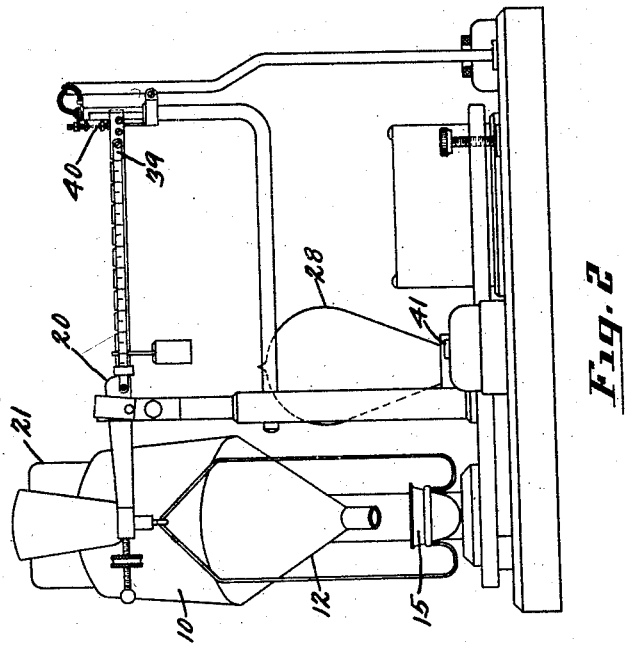

Sept. 1, 1925.　　　　C. F. KETTERING ET AL　　　1,552,170
WEIGHING MACHINE
Filed May 11, 1923　　　3 Sheets-Sheet 3
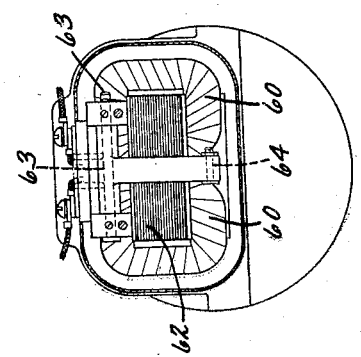
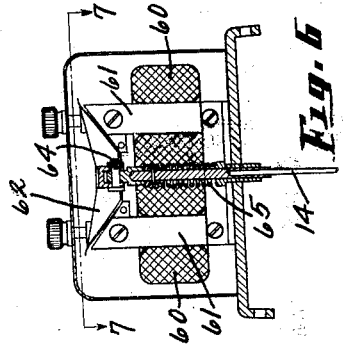
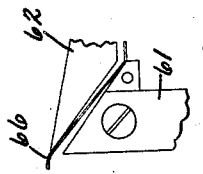
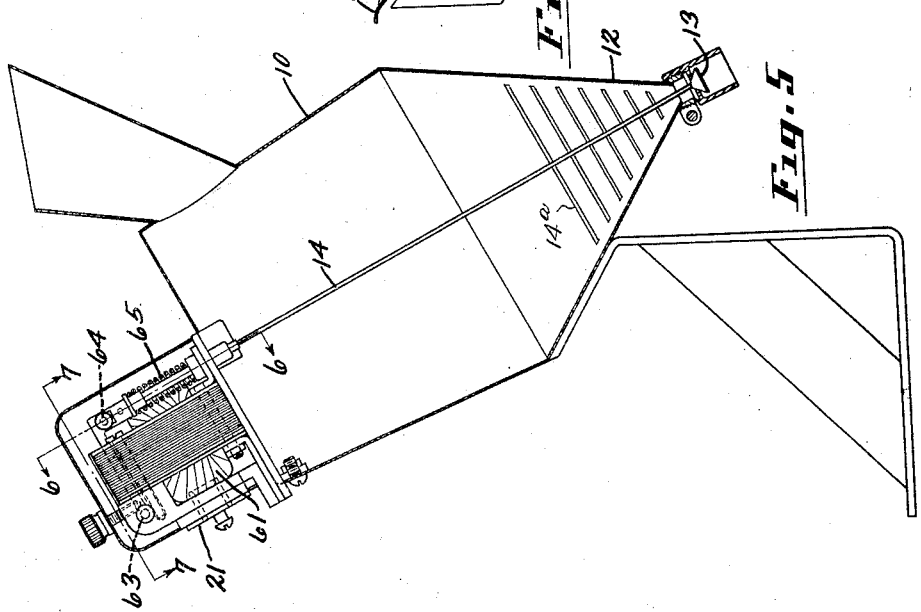
Witnesses
Geo. C. Pasco.
Wm. P. Pasco.
Inventors
Charles F. Kettering and
Charles L. Lee
By Francis D. Hardesty
Their Attorney Patented Sept. 1, 1925.

1,552,170

UNITED STATES PATENT OFFICE.

CHARLES F. KETTERING AND CHARLES L. LEE, OF DAYTON, OHIO, ASSIGNORS TO GENERAL MOTORS RESEARCH CORPORATION, OF DAYTON, OHIO, A CORPORATION OF DELAWARE.

WEIGHING MACHINE.

Application filed May 11, 1923. Serial No. 638,396.

*To all whom it may concern:*

Be it known that we, CHARLES F. KETTERING and CHARLES L. LEE, citizens of the United States of America, residing at Dayton, county of Montgomery, and State of Ohio, have invented certain new and useful Improvements in Weighing Machines, of which the following is a full, clear, and exact description.

This invention relates to an automatic weighing machine for weighing out portions of a substance which does not flow easily.

An object of this invention is to provide such a machine with means to cause the substance to be weighed to flow out from its container in a uniform stream until the predetermined amount has been delivered and then to automatically cut off the flow.

More specific objects are to provide improved and simple means for causing the substance to flow in a uniform stream, and improved means for automatically stopping the flow immediately upon obtaining the desired predetermined amount of the substance.

Further objects and advantages of the present invention will be apparent from the following description, reference being had to the accompanying drawings wherein a preferred embodiment of the present invention is clearly shown.

In the drawings:

Fig. 2 is a side elevation of the machine showing the arrangement of the balance and the hopper;

Fig. 3 shows on an enlarged scale, the electrical contacts at the end of the balance arm;

Fig. 4 is a section on line 4—4 of Fig. 3;

Fig. 5 is a section through the hopper but showing the electrical vibrator mechanism at the top in elevation;

Fig. 6 is a section on line 6—6 of Fig. 5;

Fig. 7 is a section on line 7—7 of Figs. 5 and 6; and

Fig. 8 is a detail view showing the nonmagnetic spring means between the magnet core and its armature to prevent sticking of the armature.

Similar reference characters refer to similar parts throughout the several views.

Figure 1:
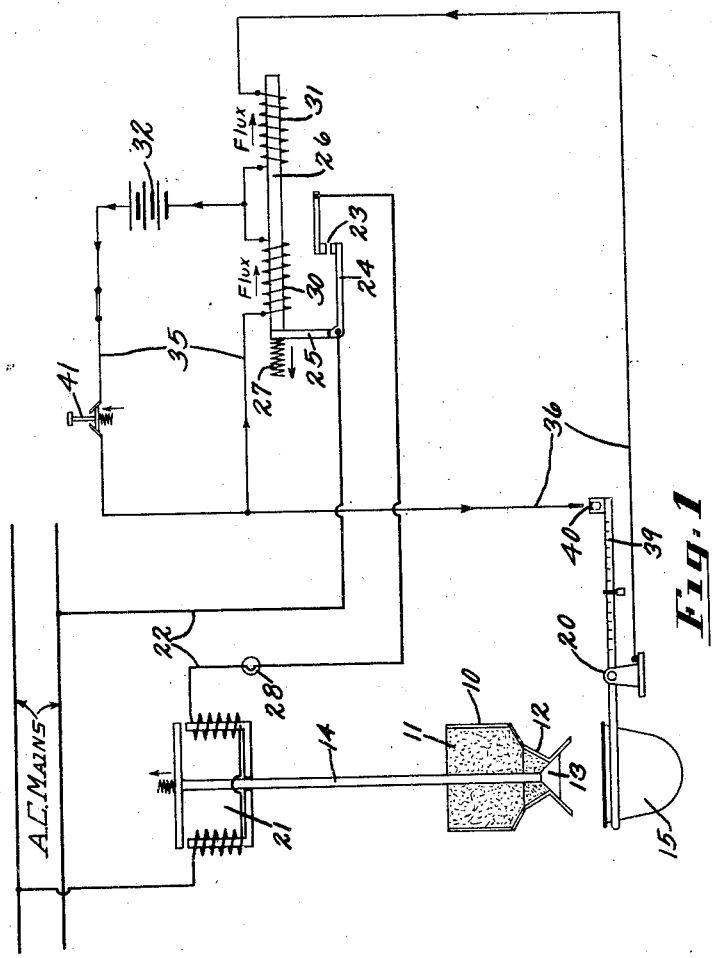
Fig. 1 is a diagrammatic layout of a weighing machine built according to this invention and the electrical circuits therefor.

The general scheme of operation of the device, as diagrammatically illustrated in Fig. 1, will first be described. 10 is the hopper containing the supply of the substance 11 to be weighed out in desired portions on the balance 20. The hopper 10 is provided with a funnel shaped bottom 12 having a valve 13 at its lowest point. This valve 13 has a shank 14 extending through the material 11, and is provided with an electrical vibrating means 21 which reciprocates the shank 14 very rapidly, thus causing the substance 11 to flow in a fine uniform stream from the hopper 10 into the cup 15 on the balance beam. The form of vibrator shown in the drawings is an alternating current electromagnet receiving current from the A. C. circuit 22. This circuit is provided with a switch 23 having a movable contact arm 24 which is operated in one direction by the armature 25 of the electromagnet 26 and in the other direction by the tension spring 27. This electromagnet 26 is wound with two coils, preferably high resistance coils, one of the coils 30 being sufficiently strong, when energized from the battery 32, to hold the armature 25 in attracted position against the tension of spring 27 but insufficiently strong to draw the armature from its unattracted to its attracted position. The other coil 31, when energized from battery 32, is sufficiently strong to attract armature 25 from any position and in so doing to open switch 23. The circuit for the "holding coil" 30 is designated by numeral 35 and that for the "attracting coil" 31 by numeral 36. Circuit 36 is arranged to be normally open by means of an electric switch 40 on the end of the balance beam. When the balance beam is raised, switch 40 is closed, the attracting coil 31 is energized thereby, attracting armature 25 and opening the alternating current switch 23, which causes the vibrator 21 to cease vibrating and the material 11 to immediately cease flowing into the cup 15.

When the filled cup 15 is removed, the switch 40 is again of course broken, however, the holding coil 30 is able to hold the armature 25 and thus keep the A. C. switch 23 open. An empty cup 15 is put in position and, everything being ready, the vibrator is set in operation by breaking circuit 35 by means of the spring held push button 41, whereupon the holding coil 30 is deenergized, thus permitting spring 27 to close the A. C. switch 23. It is necessary to hold the push button 41 down only momentarily, since, after armature 25 leaves its attracted position, the circuit 35 may be again closed without having any effect upon movement of armature 25. The coils 30 and 31 are preferably so wound that they assist each other, hence, when the beam switch 40 is closed the movement of armature 25 is very quick and the flow of material is stopped instantaneously. A lamp 28 is provided in the A. C. circuit 22 to provide suitable resistance and as an indicator of the current.

The details of construction of the beam switch 40 are shown in Figs. 3 and 4. The small mercury cup 50 is suitably fastened to the end of the balance beam 39 and filled with mercury to the proper level. The stationary contact 51 is suitably mounted immediately above the mercury and is preferably adjustable, as clearly illustrated, so that contact may be made with the mercury at exactly the proper time. The beam 39 up to its pivot point and the frame of the balance serve as part of the electric circuit 36. The details of construction of the vibrator 21 are shown in Figs. 5 to 8 inclusive. The alternating current coils 60 are provided with a laminated iron core 61 across the open ends of which extends the laminated iron armature 62. This armature 62 is pivoted at one side on the stationary pin 63, and at its opposite side is pivoted at pin 64 to the upper end of shank 14 of the hopper valve 13. The armature 62 is pressed away from the electromagnet 51 by the compression spring 65, as will be clearly understood from Fig. 6. A thin sheet metal spring 66 of nonmagnetic material is arranged to lie in between the armature 62 and the poles of the core 61 to overcome the tendency of the armature to stick to the poles (see Fig. 8). When alternating current is passed through the circuit 22, the armature 62 will vibrate very rapidly, thus causing valve 13 to open and close very rapidly. If the material in the hopper 10 does not flow very easily, the vibrations of valve 13 and its shank 14 will so shake and jar the entire hopper as to cause the material to flow out in an even uniform stream as long as the current is passing through the electromagnet 21.

If desired, the shank 14 may be provided at its lower end with projections 14ª of any suitable shape and length in order to more thoroughly stir up the material and to cause it to flow more steadily.

While the form of embodiment of this invention as herein disclosed, constitutes a preferred form, it is to be understood that other forms might be adopted, all coming within the scope of the claims which follow.

What is claimed is as follows:

1. In an automatic machine for weighing out portions of a substance which does not flow easily, a balance beam having a container for receiving said portions, a vibrating valve for delivering a thin stream of the substance to the container, and means to stop said vibration immediately after the container has received a predetermined amount of said substance.

2. In an automatic machine for weighing out portions of a substance which does not flow easily, a balance beam having a container for receiving said portions, a vibrating poppet valve for delivering a thin stream of the substance to the container, and electrical means to stop said vibration immediately after the container has received a predetermined amount of said substance.

3. In an automatic machine for weighing out portions of a substance which does not flow easily, a balance beam having a container for receiving said portions, a vibrating valve for delivering a thin stream of the substance to the container, and electrical means to stop said vibration immediately after the container has received a predetermined amount of said substance; said electrical means being actuated by the movement of the balance beam.

4. In a dispensing machine for delivering predetermined portions of a substance from a larger quantity; a switch; means controlled by said switch for causing the delivery of said substance; an electromagnet having a holding coil normally to hold said switch open and an actuating coil to open the switch; means for deenergizing the holding coil to cause the switch to close and thus cause delivery of said substance; and means to energize the actuating coil when the desired amount of substance has been delivered, whereby the switch is opened and substance delivery stopped.

5. In a dispensing machine for delivering predetermined portions of a substance from a larger supply; a circuit interrupter including a contact make and break device, an actuating coil for moving the device to contact-breaking position, and a holding coil to maintain the device in this breaking position; vibrating means in circuit connection with the make and break device, for causing delivery of the substance; means for deenergizing the holding coil to cause the device to be moved to making position and thus cause the operation of the vibrator; and means to energize the actuating coil when the desired amount of substance has been delivered, whereby the make and break device will be moved to contact-breaking position.

6. In an automatic machine for delivering predetermined portions of a substance from a larger quantity; a vibrator for causing delivery of the substance; a switch for controlling the vibrator; and an electromagnet adapted to operate the switch; means for deenergizing the electromagnet to cause the switch to close, whereby the vibrator will be operated to deliver substance; and automatic means to energize the magnet when the desired amount of substance has been delivered, whereby the switch will be opened and the vibrator stopped.

7. In an automatic machine for delivering predetermined portions of a substance from a larger quantity; a vibrator for causing delivery of the substance; a switch for controlling the vibrator; an electromagnet adapted to operate the switch; means for deenergizing the electromagnet to cause the switch to close, whereby the vibrator will be operated to deliver substance; and automatic means regulated by the amount of substance delivered to energize the magnet for opening the switch and stopping the vibrator.

8. A weighing machine including a balancing beam having a receptacle; vibrating means for delivering substance to the receptacle; a switch and circuit with the vibrating means and normally closed to cause operation of the vibrator; an electromagnet adapted to open the switch and maintain it in open position; means on the balancing beam for causing the electromagnet to open the switch and maintain it in open position when the substance in the receptacle has reached a desired weight; and a manually-operated switch for deenergizing the electromagnet to permit said switch to close, whereby the vibrator will again be brought into operation.

In testimony whereof we hereto affix our signatures.

CHARLES F. KETTERING.
CHARLES L. LEE.